(12) United States Patent
Oshima et al.

(10) Patent No.: US 6,818,710 B2
(45) Date of Patent: Nov. 16, 2004

(54) PROCESS FOR PRODUCING MODIFIED POLYMER RUBBER

(75) Inventors: Mayumi Oshima, Ichihara (JP); Seiichi Mabe, Ichihara (JP); Katsunari Inagaki, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/403,127

(22) Filed: Apr. 1, 2003

(65) Prior Publication Data

US 2003/0216522 A1 Nov. 20, 2003

(30) Foreign Application Priority Data

Apr. 5, 2002 (JP) ........................................ 2002-103483

(51) Int. Cl.$^7$ ........................... C08F 4/46; C08F 236/10
(52) U.S. Cl. ........................ 526/87; 525/272; 525/313; 525/379; 526/88; 526/178; 526/180; 526/181
(58) Field of Search ............................. 525/272, 87, 313, 525/379; 526/178, 180, 181, 87, 88

(56) References Cited

U.S. PATENT DOCUMENTS

| | | | | |
|---|---|---|---|---|
| 4,975,491 A | * | 12/1990 | Quirk | 525/288 |
| 5,171,800 A | * | 12/1992 | Bronstert | 526/173 |
| 6,133,388 A | * | 10/2000 | Lee et al. | 526/180 |

FOREIGN PATENT DOCUMENTS

| | | |
|---|---|---|
| EP | 0 334 042 B1 | 9/1989 |
| EP | 0 493 364 A2 | 7/1992 |
| JP | 5-46365 B2 | 7/1993 |
| JP | 2540901 B2 | 7/1996 |

* cited by examiner

*Primary Examiner*—Fred Teskin
(74) *Attorney, Agent, or Firm*—Sughrue Mion, PLLC

(57) ABSTRACT

There is provided a process for producing a modified polymer rubber, which comprises the steps of:

(1) reacting one part by mol of an organoalkali metal compound with n±0.7 (n is an integer of 3 or more) parts by mol of a specific diphenyl compound to produce a reaction mixture, (2) polymerizing in the presence of the produced reaction mixture an aromatic vinyl monomer and a conjugated diene monomer in a hydrocarbon solvent, and after completion of the polymerizing, stirring for at least 30 minutes, to produce a polymerization reaction mixture, and (3) repeating such an operation n−2 times that (i) an aromatic vinyl monomer and a conjugated diene monomer are added to the produced polymerization reaction mixture, and polymerized, and (ii) after completion of the polymerizing, stirring is carried out for at least 30 minutes, and thereby producing a modified polymer rubber, whose both ends and n−2 positions in its chain are modified by the compound represented by the formula (1).

4 Claims, No Drawings

PROCESS FOR PRODUCING MODIFIED POLYMER RUBBER

FIELD OF THE INVENTION

The present invention relates to a process for producing a modified polymer rubber, which comprises simple steps. Since said modified polymer rubber has superior impact resilience, it is capable of producing motorcar tires having superior fuel cost saving.

BACKGROUND OF THE INVENTION

A styrene-butadiene copolymer obtained by emulsion polymerization is known as rubber used for motorcar tires. However, said copolymer has a problem that motorcar tires comprising said copolymer are unsatisfactory from a viewpoint of fuel cost saving, because the copolymer has insufficient impact resilience.

In order to obtain rubber having superior impact resilience, (1) JP-B 5-46365 discloses a process, which comprises copolymerizing butadiene and styrene in a hydrocarbon solvent using an organolithium compound as an initiator, and a Lewis base such as ether as a microstructure controlling agent, and (2) Japanese Patent No. 2540901 proposes a process, which comprises reacting an alkali metal bound at the end of a diene polymer rubber with a specific acrylamide, thereby obtaining a modified diene polymer rubber having improved impact resilience.

However, the above-mentioned processes have a problem that it is difficult to (1) introduce satisfactory number of polar groups, and (2) control strictly positions at which the polar groups are introduced.

Further, while a level of a demand for fuel cost saving of motorcar tires is recently higher from an environmental view, any of the above-mentioned copolymer rubbers can hardly meet such a demand.

SUMMARY OF THE INVENTION

An object of the present invention is to provide a process comprising simple steps for producing a modified polymer rubber having superior impact resilience, which modified polymer rubber is accordingly capable of producing motorcar tires having superior fuel cost saving.

The present invention provides a process for producing a modified polymer rubber, which comprises the steps of:

(1) reacting one part by mol of an organoalkali metal compound with n±0.7 (n is an integer of 3 or more) parts by mol of a compound represented by the following formula (1) to produce a reaction mixture,

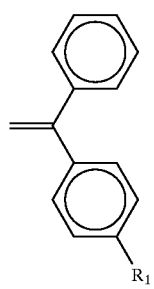

(1)

wherein $R_1$ is an amino group, an alkoxy group, a silyloxy group, an acetal group, a carboxyl group, a mercapto group or a derivative thereof (hereinafter referred to as "step (1)"), (2) polymerizing in the presence of the produced reaction mixture an aromatic vinyl monomer and a conjugated diene monomer in a hydrocarbon solvent, and after completion of the polymerizing, stirring for at least 30 minutes, to produce a polymerization reaction mixture (hereinafter referred to as "step (2)"), and (3) repeating such an operation n−2 times that (i) an aromatic vinyl monomer and a conjugated diene monomer are added to the produced polymerization reaction mixture, and polymerized, and (ii) after completion of the polymerizing, stirring is carried out for at least 30 minutes, and thereby producing a modified polymer rubber, whose both ends and n−2 positions in its chain are modified by the compound represented by the formula (1) (hereinafter referred to as "step (3)").

The present invention also provides a process for producing a modified polymer rubber, which comprises the steps of:

(1) reacting one part by mol of an organoalkali metal compound with n±0.7 (n is an integer of 3 or more) parts by mol of a compound represented by the above-mentioned formula (1) to produce a reaction mixture (hereinafter referred to as "step (1)").

(2) polymerizing in the presence of the produced reaction mixture an aromatic vinyl monomer and a conjugated diene monomer in a hydrocarbon solvent, and after completion of the polymerizing, stirring for at least 30 minutes, to produce a polymerization reaction mixture (hereinafter referred to as "step (2)"), (3) repeating such an operation n−2 times that (i) an aromatic vinyl monomer and a conjugated diene monomer are added to the produced polymerization reaction mixture, and polymerized, and (ii) after completion of the polymerizing, stirring is carried out for at least 30 minutes, and thereby producing a modified polymer rubber, whose both ends and n−2 positions in its chain are modified by the compound represented by the formula (1) (hereinafter referred to as "step (3)"), and (4) modifying further the produced modified polymer rubber with a modifier having a functional group, and thereby producing a modified polymer rubber, whose initial end is modified by the compound represented by the formula (1), whose terminal end is modified by two functional groups, wherein one of said two functional groups is derived from the compound represented by the formula (1), and another thereof is derived from the modifier, and each of n−2 positions in whose chain is modified by one functional group of the compound represented by the formula (1) (hereinafter referred to as "step (4)").

DETAILED DESCRIPTION OF THE INVENTION

Examples of the conjugated diene monomer used in the present invention are 1,3-butadiene, isoprene, 1,3-pentadiene (piperylene), 2,3-dimethyl-1,3-butadiene and 1,3-hexadiene. Of these, 1,3-butadiene or isoprene is preferable from a viewpoint of availability and physical properties of a modified polymer rubber obtained.

Examples of the aromatic vinyl monomer used in the present invention are styrene, α-methylstyrene, vinyltoluene, vinylnaphthalene, divinylbenzene, trivinylbenzene and divinylnaphthalene. Of these, styrene is preferable from a viewpoint of availability and physical properties of a modified polymer rubber obtained.

In the formula (1), preferable $R_1$ is an N,N-dimethylamino group, an N,N-diethylamino group, an N,N-dipropylamino group, an N,N-dibutylamino group or a morpholino group.

Examples of the compound represented by the formula (1) are 1-(4-N,N-dimethylaminophenyl)-1-phenylethylene, 1-(4-N,N-diethylaminophenyl)-1-phenylethylene, 1-(4-N,N-dipropylaminophenyl)-1-phenylethylene, 1-(4-N,N-dibutylaminophenyl)-1-phenylethylene and 1-(4-morpholinophenyl)-1-phenylethylene. In addition to the above-mentioned compounds having one polar group, diphenylethylene derivatives having two polar groups such as 1,1-di(4-dimethylaminophenyl)ethylene and 1,1-di(4-diethylaminophenyl)ethylene can be used. However, compounds having one polar group are industrially preferable from a viewpoint of excellent solubility for a hydrocarbon solvent.

An example of the organoalkali metal compound used in the present invention is a hydrocarbon compound containing a metal such as lithium, sodium, potassium, rubidium and cesium. Among them, preferable is a hydrocarbon compound containing lithium or sodium having from 2 to 20 carbon atoms.

Examples of the organoalkali metal compound are ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenyl-butyllithium, cyclohexyllithium, 4-cyclopentyllithium and 1,4-dilithio-butene-2. Among them, preferable is n-butyllithium or sec-butyllithium, because a reaction mixture, which gives a modified polymer rubber having a narrow molecular weight distribution, is obtained at a rapid reaction rate.

One part by mol of the organoalkali metal compound reacts with one part by mol of the compound represented by the formula (1). Therefore, when one part by mol of the former is reacted with n±0.7 parts, and preferably n parts by mol of the latter (n is an integer of three or more), a reaction mixture obtain in the step (1) contains an unreacted compound represented by the formula (1). An upper limit of n is not particularly limited. Said upper limit is preferably not more than 20 from a viewpoint of controlling a preferable viscosity range of a polymerization reaction mixture obtained in the next step. Excess of the compound represented by the formula (1) exists stably during polymerization of monomers in the step (2). When said polymerization in the step (2) is completed to produce a polymer, one equivalent of the compound represented by the formula (1) reacts with an end of said polymer. Additional monomers are added to continue the polymerization; and after completion of said polymerization, the obtained polymerization reaction mixture is stirred for not less than 30 minutes, usually from 30 minutes to 5 hours, and preferably from 30 minutes to 2 hours (step (3)), wherein additional one equivalent of the compound represented by the formula (1) reacts with an end of said polymer.

In the present invention, a reaction rate of the compound represented by the formula (1) is slower than those of an aromatic vinyl monomer and a conjugated diene monomer. Therefore, the reason why the present invention gives a modified polymer rubber modified at various positions thereof by the compound represented by the formula (1) is as follows:

(I) the unreacted compound represented by the formula (1) contained in the reaction mixture obtained in the step (1) reacts with an end of a polymer contained in the polymerization reaction mixtures obtained in the step (2), and thereafter, (II) the unreacted compound represented by the formula (1) contained in the polymerization reaction mixture obtained in the step (2) reacts with respective ends of respective polymers obtained respective polymerization reaction mixtures, each of which mixtures is obtained by each of n−2 times operations in the step(3).

The "completion of polymerization" in the present invention means that no monomers exist in the reaction mixture, and a point of time when all monomers have been consumed can be determined by a conventional method.

When an amount of the compound represented by the formula (1) is less than n±0.7 mol, the obtained modified polymer rubber is improved insufficiently in its fuel cost saving, because a proportion of a polymer rubber, which is modified both at its one end and at n−2 points in its polymer chain, is increased. When said amount exceeds n±0.7 mol, an amount of the unreacted compound represented by the formula (1) contained in the polymerization reaction mixture is increased, and therefore it is not preferable from an economical point of view, because in case of recycling and reusing a solvent contained in said polymerization reaction mixture, there is required an additional step of separating the compound represented by the formula (1) contained in said solvent. Also, it is possible to produce a rubber modified both at its one end and at optional n−1 points in its polymer chain by adding monomers after the step (3) and polymerizing them. In the present invention, it is possible to change n−2 modified positions in the polymer chain by changing an amount of respective monomers added stepwise.

In the present invention, a weight ratio of the conjugated diene monomer/the aromatic vinyl monomer is preferably from 50/50 to 90/10, and more preferably from 55/45 to 85/15. When the ratio is less than 50/50, an obtained modified polymer rubber may be insoluble in a hydrocarbon solvent, and as a result, it may impossible to carry out a homogeneous polymerization. When the ratio exceeds 90/10, strength of an obtained modified polymer rubber obtained may decrease.

The conjugated diene monomer or the aromatic vinyl monomer used in the present invention may be combined with randomizers and/or compounds for controlling a content of a vinyl bond derived from the conjugated diene monomer. A polymerization method in the present invention is not particularly limited.

As the above-mentioned compounds for controlling a content of a vinyl bond, Lewis basic compounds are exemplified. As said compounds, an ether or a tertiary amine is preferable from a viewpoint of industrial availability.

Examples of the above-mentioned ethers are cyclic ethers such as tetrahydrofuran, tetrahydropyran and 1,4-dioxane; aliphatic mono ethers such as diethyl ether and dibutyl ether; aliphatic diethers such as ethylene glycol dimethyl ether, ethylene glycol diethyl ether, ethylene glycol dibutyl ether, diethylene glycol diethyl ether and diethylene glycol dibutyl ether; and aromatic ethers such as diphenyl ether and anisole.

Examples of the above-mentioned tertiary amines are triethylamine, tripropylamine, tributylamine, N,N,N',N'-tetramethylethylenediamine, N,N-diethylaniline, pyridine and quinoline.

In the present invention, the modified polymer rubber obtained in the step (3) may be reacted with water or an alcohol such as methanol, ethanol, propanol and butanol (in this case, an active end of the modified polymer rubber is deactivated), or a modifier having a functional group.

Examples of the modifier having a functional group are cyclic ether compounds such as ethylene oxide, propylene oxide, glycidyl methacrylate, tetraglycidylmetaxylene diamine, tetraglycidyl-1,3-bisaminomethylcyclohexane, tetraglycidyldiaminodiphenylmethane, tetraglycidyl-p-phenylene diamine, diglycidylaniline and diglycidylorthotoluidine; ketone compounds such as dimethylaminobenzophenone, diethylaminobenzophenone, morpholinobenzophenone and morpholinoacetophenone; acrylamide compounds such as dimethylacrylamide, diethylacrylamide and dimethylaminopropylacrylamide; cyclic amine compounds such as 1,3-dimethyl-2-imidazolidinone, 1,3-diethyl-2-imidazolidinone, 1,3-dipropyl-2-imidazolidinone, 1-methyl-3-ethyl-2-imidazolidinone, 1-methyl-3-propyl-2-imidazolidinone, 1-methyl-3-butyl-2-imidazolidinone, 1-methyl-3-(2-ethoxyethyl)-2-imidazolidinone and 1,3-dimethyl-3,4,5,6-tetrahydropyrimidinone; and straight-chain amine compounds such as 1,1-dimethoxytrimethylamine, 1,1-diethoxytrimethylamine, 1,1-di-n-propoxytrimethylamine, 1,1-di-iso-propoxytrimethylamine, 1,1-di-n-butoxytrimethylamine and 1,1-di-tert-butoxytrimethylamine. Among them, particularly preferable are cyclic amine compounds or straight-chain amine compounds from a viewpoint of remarkable improvement of fuel cost saving and excellent solubility for a solvent; and preferable is 1,1-dimethoxytrimethylamine or 1,3-dimethyl-2-imidazolidinone having a small molecular weight from a viewpoint of remarkable improvement of fuel cost saving with a small quantity use thereof.

A hydrocarbon solvent used in the present invention is a solvent, which does not deactivate the organoalkali metal compound. Preferable examples thereof are aliphatic hydrocarbons, aromatic hydrocarbons and alicyclic hydrocarbons. Particularly preferable examples thereof are those having 2 to 12 carbon atoms. Specific examples thereof are propane, n-butane, iso-butane, n-pentane, iso-pentane, n-hexane, cyclohexane, propene, 1-butene, iso-butene, trans-2-butene, cis-2-butene, 1-pentene, 2-pentene, 1-hexene, 2-hexene, benzene, toluene, xylene and ethylbenzene, and a combination of at least two thereof.

A ratio of the modified polymer rubber to the modifier having a functional group used in the step (4) is usually from 0.1 to 10 mol, and preferably from 0.5 to 2 mol per one mol of the organoalkali metal compound used when adding an alkali metal. When said ratio is less than 0.1 mol, fuel cost saving is improved insufficiently. When said ratio exceeds 10 mol, an amount of the unreacted modifier contained in the polymerization reaction mixture is increased, and therefore it is not preferable from an economical point of view, because in case of recycling and reusing a solvent contained in said polymerization reaction mixture, there is required an additional step of separating the modifier contained in said solvent.

The modified polymer rubber in accordance with the present invention can also be produced by an alternative process comprising the steps of:
(i) using one part by mol of the compound represented by the formula (1) in the step (1),
(ii) adding further said compound after completion of the polymerization in the step (2), and stirring for not less than 30 minutes, and
(iii) repeating n−2 times such an operation in the step (3), that said compound is added further after completion of the polymerization, and the obtained reaction mixture is stirred for not less than 30 minutes.

However, the above-mentioned alternative process has further addition times of said compound of n−1, the process in accordance with the present invention has further addition times of said compound of 0 (zero); namely, the process in accordance with the present invention comprises simpler steps.

A reaction caused by contacting the modified polymer rubber obtained in the step (3) with water, an alcohol or the modifier having a functional group proceeds rapidly. A reaction temperature of said reaction is usually from room temperature to 80° C. and reaction time thereof is from several seconds to several hours. A preferable example of a method for said contacting is adding a predetermined amount of water, an alcohol or the modifier having a functional group into the reaction mixture obtained in the step (3).

From a viewpoint of kneading processability of the obtained modified polymer rubber, it is allowed to add a coupling agent represented by the following formula after the step (3) or the step (4):

wherein R is an alkyl group, an alkenyl group, a cycloalkenyl group or an aromatic hydrocarbon group; M is a silicon atom or a tin atom; X is a halogen atom; a is an integer of from 0 to 2; and b is an integer of from 2 to 4.

The above-mentioned coupling agent is added in an amount of usually from 0.03 to 0.4 mol, and preferably from 0.05 to 0.03 mol, per one mol of the organoalkali metal compound. When the amount is less than 0.03 mol, an improving effect of processability of the modified polymer rubber maybe small. When the amount exceeds 0.4 mol, a proportion of the modifier participating in a reaction decreases, so that an improving effect of fuel cost saving may decrease.

The produced modified polymer rubber can be solidified according to a solidifying method, which is usually carried out in a production of rubber by solution polymerization, such as (1) a method comprising the step of adding a coagulant and (2) a method comprising the step of adding steam. A solidifying temperature is not particularly limited.

Mooney viscosity ($ML_{1+4}$) of the modified polymer rubber obtained by the process in accordance with the present invention is preferably from 10 to 200, and more preferably from 20 to 150. When the Mooney viscosity is less than 10, mechanical properties such as tensile strength of vulcanized rubber thereof may decrease. When the Mooney viscosity exceeds 200, miscibility when blending said modified polymer rubber with other rubber to produce a rubber composition may be so poor that it is difficult to produce said rubber composition, and as a result, mechanical properties of a vulcanized rubber composition thereof may decrease.

A content of a vinyl bond (which bond is derived from the conjugated diene monomer) contained in the modified polymer rubber obtained by the process in accordance with the present invention is preferably from 10 to 70%, and more preferably from 15 to 60%. When the content is less than 10%, a glass transition temperature of the modified polymer rubber obtained may be lowered to deteriorate a grip performance of motorcar tires composed of the modified polymer rubber. When the content exceeds 70%, a glass transition temperature of the modified polymer rubber obtained may be elevated to deteriorate the impact resilience of the modified polymer rubber.

The obtained modified polymer rubber may be used in combination with other components such as other rubbers and various additives to produce a rubber composition.

Examples of the above-mentioned other rubber are styrene-butadiene copolymer rubber obtained by emulsion polymerization; polybutadiene rubber, butadiene-isoprene copolymer rubber and styrene-butadiene copolymer rubber obtained by solution polymerization using catalysts such as an anion polymerization catalyst and a ziegler type catalyst; natural rubber; and a combination of at least two thereof.

As to the rubber composition comprising the other rubber and the modified polymer rubber, a proportion of the latter rubber is preferably not less than 10% by weight, and more preferably not less than 20% by weight, based on 100% by weight of a total weight of both rubbers. When the proportion is less than 10% by weight, the impact resilience of the rubber composition obtained may hardly be improved, and also processability thereof is not good.

A kind and an amount of the above-mentioned additives can be determined depending upon purposes of using the rubber composition obtained. Examples of the additives usually employed in a rubber industry are vulcanizing agents such as sulfur; stearic acid; zinc white; thiazol type vulcanization accelerators; vulcanization accelerators such as thiuram type vulcaniztion accelerators and sulfenamide type vulcanization accelerators; organic peroxides; reinforcing agents such as carbon black of HAF and ISAF grades; fillers such as silica, calcium carbonate and talc; extender oils; processing coagents; and antioxidants. An amount of carbon black or silica added is preferably 10 to 150 parts by weight based on 100 parts by weight of a rubber component (which means the modified polymer rubber or other rubber). When said amount is less than 10 parts by weight, reinforcing effect to the rubber component is not sufficient, and said amount exceeds 150 parts by weight, elongation of the obtained rubber composition may decrease.

A process for producing the above-mentioned rubber composition is not limited. An example thereof is a process comprising the step of mixing respective components with use of a known mixer such as a roll and a Bambury mixer. The resulting rubber composition is usually vulcanized, and is used as a vulcanized rubber composition.

Since the modified polymer rubber obtained by the process in accordance with the present invention is superior in impact resilience and processability, a rubber composition comprising said rubber is most suitable for motorcar tires having superior fuel cost saving. Said rubber composition can be also employed for uses such as the sole of a shoe, floor materials and rubber vibration insulators.

EXAMPLE

The present invention is explained with reference to the following Examples, which are not intended to limit the scope of the present invention.

Reference Example 1

1-(4-N,N-dimethylaminophenyl)-1-phenylethylene represented by the above-mentioned formula (1) was obtained by (i) adding gradually a solution prepared by dissolving 25 g of 4-N,N-dimethylaminobenzophenone in 100 ml of tetrahydrofuran to 80 ml of a tetrahydrofuran solution obtained by methyltriphenylphosphonium bromide with tert-butoxy potassium, (ii) after completion of said adding, reacting for 4 hours at 0° C., and (iii) purifying the obtained reaction mixture.

Example 1

A 5 liter-inner volume stainless steel polymerization reactor was washed and dried, and thereafter purged with dry nitrogen. Successively, 178 g of 1,3-butadiene, 73 g of styrene, 30.5 g of tetrahydrofuran, 2.55 kg of hexane and a cyclohexane solution, which solution was obtained by reacting in cyclohexane 5.0 mmol of n-butyllithium and 15.0 mmol (3.52 g) of 1-(4-N,N-dimethylaminophenyl)-1-phenylethylene obtained in Reference Example 1, were introduced there (1st polymerization) was carried out at 65° C. for 1.5 hours under stirring, and then the obtained mixture was further stirred for 1 hour to obtain a polymerization reaction mixture.

To the obtained polymerization reaction mixture, 178 g of 1,3-butadiene and 73 g of styrene were introduced, and polymerization (2nd polymerization) was carried out at 65° C. for 1.5 hours under stirring, and then the obtained mixture was further stirred for 1 hour to obtain a polymerization reaction mixture. Then, to the obtained polymerization reaction mixture, 10 ml of methanol was added, and stirring was further continued for 5 minutes to obtain a reaction mixture.

The obtained reaction mixture was taken out and mixed with 2.5 g of 2,6-di-t-butyl-p-cresol, a trade name of SUMILIZER BHT, manufactured by Sumitomo Chemical Co., Ltd. Thereafter, most of hexane was evaporated, and successively the remainder was dried under reduced pressure at 55° C. for 12 hours, thereby obtaining a modified polymer rubber.

A portion of the above-mentioned polymerization reaction mixture just before starting the second polymerization, and a portion of the above-mentioned polymerization reaction mixture before adding methanol were taken out, respectively, and it was confirmed that respective portions had a deep orange color, which is a characteristic color of an anion derived from diphenylethylene.

Physical properties of the above-mentioned modified polymer rubber obtained were measured by the following methods. Results thereof are shown in Table 1.
1. Weight Average Molecular Weight (Mw)

It was measured according to GPC (gel permeation chromatography), wherein calibration was carried out using standard polystyrene.
2. Content of Vinyl Group It was measured according to infrared spectroscopic analysis.
3. Content of Styrene Unit It was measured according to refractive index method.

Comparative Example 1

A 5 liter-inner volume stainless steel polymerization reactor was washed and dried, and thereafter purged with dry nitrogen. Successively, 355 g of 1,3-butadiene, 145 g of styrene, 30.5 g of tetrahydrofuran, 2.55 kg of hexane and a hexane solution containing 2.75 mmol of n-butyllithium were introduced and polymerization was carried out at 65° C. for 3 hours under stirring.

To the obtained polymerization reaction mixture, 2.75 mmol of 1-(4-N,N-dimethylaminophenyl)-1-phenylethylene was added, and a reaction was carried out for 60 minutes under stirring. Then, to the obtained polymerization reaction mixture, 10 ml of methanol was added, and stirring was further continued for 5 minutes.

The obtained reaction mixture was taken out and mixed with 2.5 g of 2,6-di-t-butyl-p-cresol, a trade name of SUMILIZER BHT, manufactured by Sumitomo Chemical Co., Ltd. Thereafter, most of hexane was evaporated, and successively the remainder was dried under reduced pressure at 55° C. for 12 hours, thereby obtaining a polymer rubber. Physical properties of said polymer rubber were measured similarly to Example 1. Results thereof are shown in Table 1.

Comparative Example 2

Example 1 was repeated except that (1) amounts of 1,3-butadiene, styrene, n-butyl lithium and 1-(4-N,N- dimethylaminophenyl)-1-phenylethylene introduced were changed to 355 g, 145 g, 2.60 mm respectively, (2) the first polymerization time was changed to 3 hours, (3) the further stirring time of the first polymerization was changed to 60 minutes, and (4) the second polymerization was not carried out, and thereby obtaining a polymer rubber. Physical properties of said polymer rubber were measured similarly to Example 1. Results thereof are shown in Table 1.

Comparative Example 3

A 5 liter-inner volume stainless steel polymerization reactor was washed and dried, and thereafter purged with dry nitrogen. Successively, 355 g of 1,3-butadiene, 145 g of styrene, 30.5 g of tetrahydrofuran, 2.55 kg of hexane and a cyclohexane solution, which solution was obtained by reacting in cyclohexane 2.60 mmol of n-butyllithium and 2.60 mmol (0.58 g) of 1-(4-N,N-dimethylaminophenyl)-1-phenylethylene were introduced therein, and polymerization (1st polymerization) was carried out at 65° C. for 3 hours under stirring.

To the obtained polymerization reaction mixture, 2.60 mmol of 1-(4-N,N-dimethylaminophenyl)-1-phenylethylene was added, and a reaction was carried out for 60 minutes under stirring. Then, to the obtained polymerization reaction mixture, 10 ml of methanol was added, and stirring was further continued for 5 minutes.

The obtained reaction mixture was taken out and mixed with 2.5 g of 2,6-di-t-butyl-p-cresol, a trade name of SUMILIZER BHT, manufactured by Sumitomo Chemical Co., Ltd. Thereafter, most of hexane was evaporated, and successively the remainder was dried under reduced pressure at 55° C. for 12 hours, thereby obtaining a polymer rubber. Physical properties of said polymer rubber were measured similarly to Example 1. Results thereof are shown in Table 1.

TABLE 1

|  | Example 1 | Comparative Example 1 | Comparative Example 2 | Comparative Example 3 |
|---|---|---|---|---|
| Alkali metal compound/compound represented by formula (1) (molar ratio) | 1/3 | — | 1/2 | 1/1 |
| Styrene unit content (wt. %) | 29 | 29 | 29 | 29 |
| Vinyl group content (wt. %) | 40 | 40 | 42 | 42 |
| Mw (×10$^{-4}$) | 16.2 | 29.5 | 19.5 | 19.5 |
| Number of polar group introduced into respective chains |  |  |  |  |
| At the end of the chain | 2 | 1 | 2 | 2 |
| In the chain | 1 | 0 | 0 | 0 |
| Number of step after polymerization | 0 | 1 | 0 | 1 |

What is claimed is:

1. A process for producing a modified polymer rubber, which comprises the steps of:

(1) reacting one part by mol of an organoalkali metal compound with n±0.7 (n is an integer of 3 or more) parts by mol of a compound represented by the following formula (1) to produce a reaction mixture,

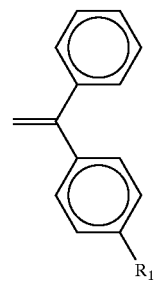

wherein $R_1$ is an amino group, an alkoxy group, a silyloxy group, or an acetal group, (2) polymerizing in the presence of the produced reaction mixture an aromatic vinyl monomer and a conjugated diene monomer in a hydrocarbon solvent, and after completion of the polymerizing, stirring for at least 30 minutes, to produce a polymerization reaction mixture, and (3) repeating such an operation n–2 times that (i) an aromatic vinyl monomer and a conjugated diene monomer are added to the produced polymerization reaction mixture, and polymerized, and (ii) after completion of the polymerizing, stirring is carried out for at least 30 minutes, and thereby producing a modified polymer rubber, whose both ends an n–2 positions in its chain are modified by the compound represented by the formula (1).

2. The process for producing a modified polymer rubber according to claim 1, wherein the $R_1$ is an N,N-dimethylamino group, an N,N-diethylamino group, an N,N-dipropylamino group, an N,N-dibutylamino group or a morpholino group.

3. A process for producing a modified polymer rubber, which comprises the steps of:

(1) reacting one part by mol of an organoalkali metal compound with n±0.7 (n is an integer of 3 or more) parts by mol of a compound represented by the following formula (1) to produce a reaction mixture,

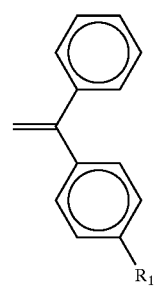

wherein $R_1$ is an amino group, an alkoxy group, a silyloxy group, or an acetal group, (2) polymerizing in the presence of the produced reaction mixture an aromatic vinyl monomer and a conjugated diene monomer in a hydrocarbon solvent, and after completion of the polymerizing, stirring for at least 30 minutes, to produce a polymerization reaction mixture, (3) repeating such an operation n–2 times that (i) an aromatic vinyl monomer and a conjugated diene monomer are added to the produced polymerization reaction mixture, and polymerized, and (ii) after completion of the polymerizing, stirring is carried out for at least 30 minutes, and thereby producing a modified polymer rubber, whose both ends an n–2 positions in its chain are modified by the compound represented by the formula (1), and (4) modifying further the produced modified polymer rubber with a modifier having a functional group, and thereby producing a modified polymer rubber, whose initial end is modified by the compound represented by the formula (1), whose terminal end is modified by two functional groups, wherein one of said two functional groups is derived from the compound represented by the formula (1), and another thereof is derived from the modifier, and each of n–2 positions in whose chain is modified by one functional group of the compound represented by the formula (1).

4. The process for producing a modified polymer rubber according to claim 3, wherein the modifier having a functional group is a cyclic amine compound or a straight-chain amine compound.

* * * * *